Dec. 31, 1929.   F. F. SHAWEKER   1,741,795
MASSAGE IMPLEMENT
Filed Nov. 25, 1927
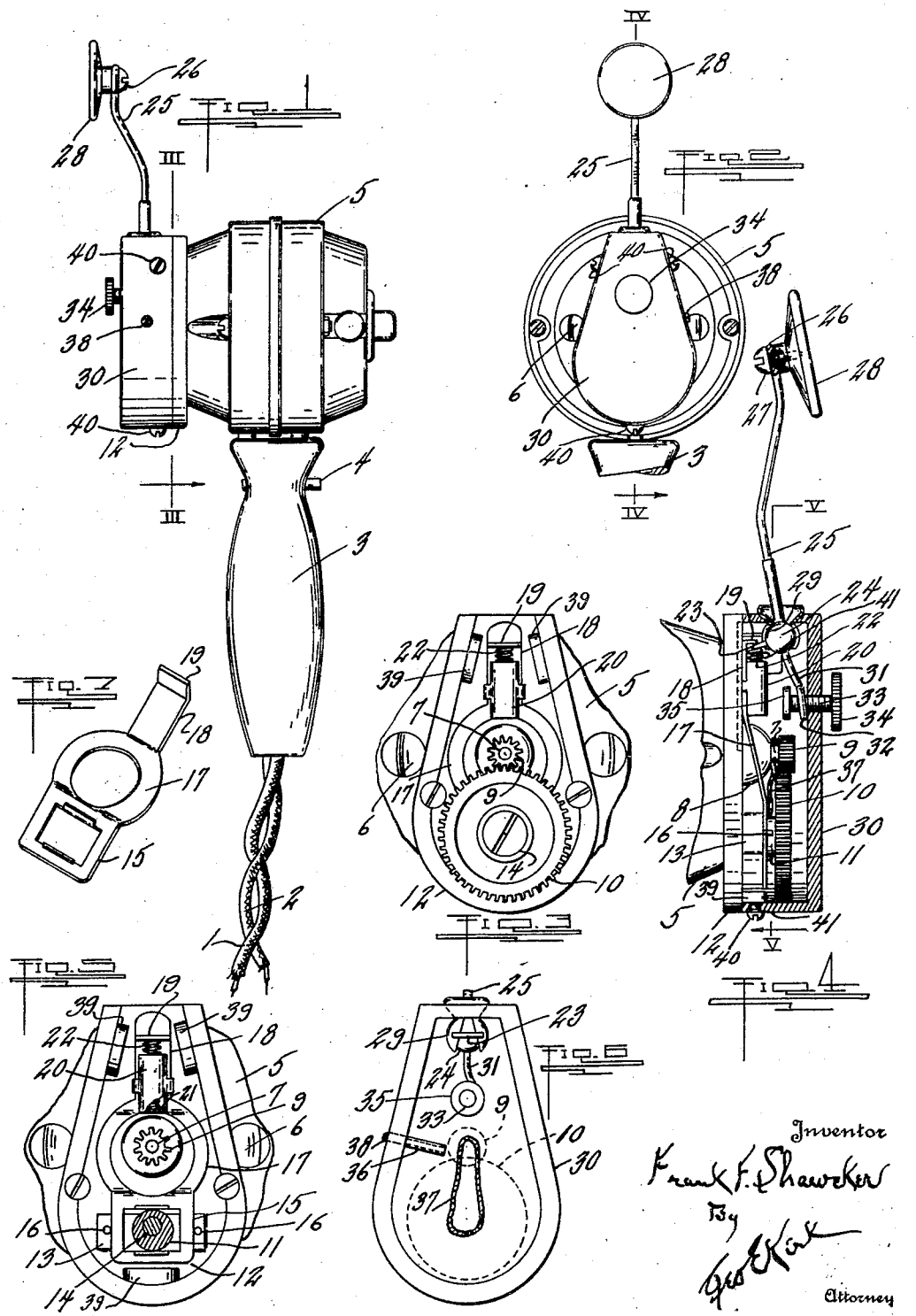

Patented Dec. 31, 1929

1,741,795

UNITED STATES PATENT OFFICE

FRANK F. SHAWEKER, OF TOLEDO, OHIO

MASSAGE IMPLEMENT

Application filed November 25, 1927. Serial No. 235,537.

This invention relates to mechanical tapping or vibrating mechanism.

This invention has utility when incorporated in massage apparatus of the electrical type.

Referring to the drawings:

Fig. 1 is a side elevation of an embodiment of the invention in a massage implement;

Fig. 2 is a view of the device of Fig. 1, from the left;

Fig. 3 is a section on the line III—III, Fig. 1, looking in the direction of the arrow;

Fig. 4 is a section on the line IV—IV, Fig. 2, looking in the direction of the arrow;

Fig. 5 is a section on the line V—V, Fig. 4;

Fig. 6 is a view looking into the cover as carrying the lever, parts being broken away; and Fig. 7 is a detail view of the connecting rod.

Electric current supply lines 1, 2, as passing through handle 3 may have current control by switch 4. This handle 3 is a mounting for housing 5 carrying electric motor 6 having shaft 7 protruding through bearing 8. This shaft 7 out-board from the bearing 8 carries pinion 9 in mesh with gear 10 having fast therewith eccentric 11 on the side of said gear toward plate 12 carried by the motor 6.

This plate 12 carries boss 13 engaged by pin 14 as a bearing for the gear 10 and its eccentric 11. This eccentric 11 is embraced by yoke 15 of connecting rod directed by guide pins 16 carried by the boss 13. This connecting rod has open region 17 embracing and clear of the shaft 7 and bearing 8 in the extent of this connecting rod in-board of the speed reduction gearing 9, 10.

This connecting rod remote from the actuating crank of the eccentric 11 has free end 18 terminating in upstanding ledge 19. The connecting rod additionally carries as fixed therewith, tubular guide portion 20 providing abutment 21 therein for compression helical spring 22 thrust toward the ledge 19 to engage tongue 23 as a pitman or short arm of a vibratory lever. Accordingly, the ledge 19 provides a positive throw of the pitman 23 toward the shaft 7 while the spring 22 as coacting with the pitman 23 and traveling with the connecting rod provides a yieldable holding of the pitman 23 toward the ledge 19. This pitman 23 is an extension from spherical fulcrum 24 of lever having arm 25 extending to eye 26 there carrying screw 27 for detachably mounting disk 28 as a massaging tool or patter of the vibratory type.

The lever 25 is stiff but not rigid. Bearing 29 for the ball joint or fulcrum 24 permits rocking of this lever 25 in housing 30 for the speed reduction gearing and motion conversion connecting rod mechanism. This lever 25 from the fulcrum 24 has extension or tail piece 31 in the housing 30. This extension terminates in eye 32 about screw 33 having threaded engagement with the housing, with knurled head 34 outward therefrom. This screw has mounted thereon collar 35 so that the play of the loose eye 32 between the housing 30 and the collar 25 may be adjusted by rotating this screw 33 as to the housing 30. There is accordingly herein a manual adjustment for varying the amplitude of oscillation of the disk 28. This adjustment may occur even with the tool in operation.

The yieldable bearing for the pitman permits this adjustment to occur. Furthermore, this yieldable pitman bearing as effective in the stroke of the device toward the flesh of the user is an assurance against harsh impact. Furthermore, there is a driving control permitting a regulation of the amplitude by the pressure of the disk 28 in the clearance of the disk 28 as to the face or portion of the body upon which the device is used.

The device is one which is compact and substantial in its design. It may be conveniently operated by the one undergoing treatment or be used by an attendant as in a beauty parlor. Accordingly the device has a value for household as well as shop usage with a range of flexibility making such adaptable to the varied requirements in practice.

The casing 30 has a duct 36 for lubricant supply to wick 37 as a distributor of lubricant in this housing. This lubricant tube 36 may be closed by screw 38. The plate 12 is provided with outstanding lugs 39 engaged by screws 40 through openings 41 in the housing 30 and effecting assembly of the housing 30 with the plate 12 and the motor housing 5.

What is claimed and it is desired to secure by Letters Patent is:

1. A massage implement embodying a motor housing, a directing handle extending toward the housing, a motor in the housing, a rotary shaft for the motor, a speed reduction transmission from the motor, a longitudinally reciprocable connecting rod from the transmission, a lever having the general direction of the handle and fulcrumed in and extending away from the housing, said lever actuable by said rod to have a free end thereof vibratory, and a massage tool carried laterally of the free end of the lever and movable relatively to said rod in lever operation.

2. A motor housing, a directing handle extending toward the housing, a motor in the housing, a shaft for the motor, a speed reduction transmission from the motor, a longitudinally reciprocable connecting rod from the transmission embracing the shaft, a vibratory lever having the general direction of the handle and fulcrumed in and extending away from the housing, and a yieldable wrist pin connection between the rod and lever.

3. A massage implement comprising a housing, a lever having a free end projecting clear of the housing, a patting tool laterally of said free end, and in the housing a fulcrum bearing for the lever, a longitudinally reciprocable connecting rod for rocking the lever relatively to the connecting rod, and a rotary shaft for actuating the connecting rod.

4. A massage motor implement having a shaft, spur gearing speed reduction from the shaft, a wrist pin actuable by the gearing, a longitudinally reciprocable connecting rod from the gearing wrist pin embracing the shaft and extending therebeyond, a housing for the gearing and rod, a lever extending to have a free end away from the housing, and a vibrator mounted on the lever free end and movable relatively to the rod as actuated by said rod.

5. A massage implement comprising a directing handle, a motor having a shaft transversely of the handle direction extent, speed reduction spur gearing from the motor providing a wrist pin, a connecting rod from the wrist pin which extends past the shaft, a lever actuable by the rod, said lever extending away from the motor and in a direction opposite the handle and having a free end, and a patting tool laterally of the free end of the lever.

In witness whereof I affix my signature.

FRANK F. SHAWEKER.